(12) United States Patent
Lemoine (10) Patent No.: US 10,027,496 B2
(45) Date of Patent: Jul. 17, 2018

(54) METHOD FOR DISTRIBUTING IDENTIFIERS OF MULTICAST SOURCES

(71) Applicant: Orange, Paris (FR)

(72) Inventor: Benoit Lemoine, Ploubezre (FR)

(73) Assignee: ORANGE, Paris (FR)

( * ) Notice: Subject to any disclaimer, the term of this patent is extended or adjusted under 35 U.S.C. 154(b) by 99 days.

(21) Appl. No.: 15/026,898

(22) PCT Filed: Sep. 11, 2014

(86) PCT No.: PCT/FR2014/052261
§ 371 (c)(1),
(2) Date: Apr. 1, 2016

(87) PCT Pub. No.: WO2015/049432
PCT Pub. Date: Apr. 9, 2015

(65) Prior Publication Data
US 2016/0226671 A1 Aug. 4, 2016

(30) Foreign Application Priority Data

Oct. 1, 2013 (FR) ...................................... 13 59509

(51) Int. Cl.
*H04L 12/28* (2006.01)
*H04L 12/18* (2006.01)
(Continued)

(52) U.S. Cl.
CPC .......... *H04L 12/185* (2013.01); *H04L 61/103* (2013.01); *H04L 61/2046* (2013.01); *H04L 61/2069* (2013.01); *H04L 65/608* (2013.01)

(58) Field of Classification Search
None
See application file for complete search history.

(56) References Cited

U.S. PATENT DOCUMENTS 6,873,627 B1 * 3/2005 Miller .................. H04L 1/1614
370/432
6,950,431 B1 * 9/2005 Nozaki ............... H04L 12/4641
370/390

(Continued)

OTHER PUBLICATIONS

Schulzrinne et al., "RTP: A Transport Protocol for Real-Time Applications; rfc3550.txt", Jul. 1, 2003, Jul. 1, 2003 (Jul. 1, 2003) XP015009332.

(Continued)

*Primary Examiner* — Farah Faroul
(74) *Attorney, Agent, or Firm* — David D. Brush; Westman, Champlin & Koehler, P.A.

(57) ABSTRACT

A method for distributing identifiers of sources from a multicast group. The sources are interconnected via an electronic communications network, and the multicast group is identified by a group address. A stream transmitted to the group address by a first source is received by a second source if the second source is already subscribed to the first source. One of the sources, known as the server, is subscribed to all of the other sources. The method includes the server performing the following acts: receiving from one of the other sources, known as an announcer source, a multicast announcement message including an announcer source identifier; and transmitting a management message to the group address, including the announcer source identifier.

13 Claims, 3 Drawing Sheets

(51) Int. Cl.
  *H04L 29/12* (2006.01)
  *H04L 29/06* (2006.01)

(56) References Cited

U.S. PATENT DOCUMENTS

| | | | |
|---|---|---|---|
| 2003/0147390 A1* | 8/2003 | Rizzo | H04L 12/185 370/390 |
| 2010/0058442 A1* | 3/2010 | Costa | H04L 63/20 726/3 |
| 2010/0125353 A1* | 5/2010 | Petit-Huguenin | H04L 67/10 700/94 |
| 2010/0333150 A1* | 12/2010 | Broerman | H04L 67/1008 725/93 |
| 2011/0072148 A1 | 3/2011 | Begen et al. | |
| 2011/0176555 A1* | 7/2011 | Poder | H04L 65/605 370/463 |
| 2013/0091251 A1* | 4/2013 | Walker | H04N 21/6125 709/219 |
| 2015/0146603 A1* | 5/2015 | Wu | H04L 12/189 370/312 |
| 2015/0372717 A1* | 12/2015 | Schrum, Jr. | H04B 3/542 370/458 |

OTHER PUBLICATIONS

Handley et al., "Session Announcement Protocol; rfc2974.txt" Oct. 1, 2000, Oct. 1, 2000 (Oct. 1, 2000) XP015008757.
Handley et al., "Session Description Protocol; rfc2327.txt", Apr. 1, 1998, Apr. 1, 1998 (Apr. 1, 1998) XP015008111.
International Search Report dated Dec. 9, 2014 for corresponding International Application No. PCT/FR2014/052261, filed Sep. 11, 2014.
English translation of the International Written Opinion dated Feb. 2, 2016 for corresponding International Application No. PCT/FR2014/052261, filed Sep. 11, 2014.
Cain et al., "Internet ghroup Management Protocol, Version 3; rfc3376.txt" Oct. 2002, Oct. 2002.
Vida et al., "Multicast Listner Discovery Version 2 (MLDv2) for IPv6; rfc3810.txt", Jun. 2004, Jun. 2004.
Friedman et al., "RTP Control Protocol Extended Reports (RTCP XR); rfc3611.txt" Nov. 2003, Nov. 2011.

* cited by examiner

METHOD FOR DISTRIBUTING IDENTIFIERS OF MULTICAST SOURCES

CROSS-REFERENCE TO RELATED APPLICATIONS

This Application is a Section 371 National Stage Application of International Application No. PCT/FR2014/052261, filed Sep. 11, 2014, which is incorporated by reference in its entirety and published as WO 2015/049432 A1 on Apr. 9, 2015, not in English.

1. FIELD OF THE INVENTION

The application for invention lies in the field of multicast data stream distribution groups.

More precisely, the application for invention relates to the distributing of the identifiers of sources in bidirectional multicast distribution groups.

2. PRIOR ART

The services implementing multicast transport in IP (Internet Protocol) networks were initially limited to the distributing of packets originating from a multicast server destined for multicast clients. Thus in the case of the distributing of television over the Internet, the network front-end server is either controlled by the operator, or controlled by a contents provider with which the operator has agreements, thereby allowing him to control the quality of service up to the client.

The multicast mode of transport is now no longer used only in the downgoing direction from a server to multicast clients, but also in the upgoing direction, allowing each multicast client to send multicast IP packets to the multicast group via the transport network.

In order to limit the number of multicast streams received by a multicast client, the latter can ask the network to receive multicast streams by specifying in addition to the IP address of the multicast group the source IP address or addresses to be authorized or excluded for example with the aid of the IGMPv3 protocol (Internet Group Management Protocol) defined in standard IETF RFC 3376 (Internet Engineering Task Force, Request For Comments) or of the MLDv2 protocol (Multicast Listener Discovery) defined in standard IETF RFC 3810.

When a multicast client subscribes to a multicast stream sent by another client or by a server, this signifies that the IP address of this other client or of the server is specified in a multicast stream reception request.

However, as long as a multicast client does not receive any IP packet originating from other multicast clients subscribed to the same group, it cannot ascertain their IP address.

When a client becomes a member of an RTP (Real-time Transfer Protocol) session such as defined by standard IETF RFC 3550 by subscribing to a multicast distribution group, it must moreover announce to the RTP session an identifier, called SSRC (Synchronization SouRCe), which is specifically its own, at the risk that it is identical to that of another client already subscribed before it to this multicast group.

Standard IETF RFC 3550 therefore provides that when a client detects, in a packet received originating from the multicast group, such an SSRC identifier, it must immediately modify its own SSRC identifier if it is identical.

However, as long as a multicast client does not receive any IP packet originating from other multicast clients subscribed to the same group, neither can it any longer receive the announcement of the SSRC identifier of these other multicast clients.

A problem arises from the fact that as long as this detection is not carried out, the use of one and the same identifier by several clients gives rise to conflicts degrading the quality of the multicast distribution.

Moreover, as the standard assumes that an SSRC identifier detected in a packet originating from the multicast group is necessarily the SSRC identifier of a client other than that which has received the packet, if for any reason an SSRC identifier returns to its client of origin in a packet, the latter modifies it needlessly.

One of the aims of the invention is to remedy these drawbacks of the prior art.

3. DISCLOSURE OF THE INVENTION

The invention improves the situation with the aid of a method for distributing identifiers of sources of a multicast distribution group, said sources being connected together through an electronic communications network, the multicast distribution group being identified by a group address, a stream sent to the group address by a first source being received by a second source if the second source is previously a subscriber to the first source, one of the sources, the so-called server, being a subscriber to all the other sources, the method comprising the following steps implemented by the server:

reception, originating from one of said other sources, called the announcer source, of a multicast announcement message comprising an announcer source identifier, sending of a management message, to the group address, comprising the announcer source identifier.

By virtue of the method for distributing identifiers according to the invention, a source of a multicast group can receive the content of the multicast announcement messages sent by another source without needing to subscribe to this other source in particular. It suffices that the source be a subscriber to the server. An announcement message indicates either an arrival of the source in the multicast group, or a departure, and, for example, uses respectively a message of SDES (Source DEscription) RTCP type or of BYE (bye, or see you) RTCP type. According to the earlier technique such as described in standard RFC 3550, the server that receives such messages never retransmits them to the address of the multicast group, but only to unicast addresses or multicast addresses of other multicast groups, since this standard forces a client to modify its identifier immediately if it receives it in a message sent to the multicast group.

According to one aspect of the distribution method according to the invention, when the multicast announcement message received during the reception step comprises an item of information regarding arrival of the announcer source in the multicast group, the reception step is followed by the following steps:

obtaining of an address of the announcer source,
verification of the presence of the identifier of the announcer source in a table of pairs {source identifier; source address},
in case of negative verification, addition of a pair {identifier of the announcer source; address of the announcer source} to the table, and the management message sent during the sending step comprises at least one pair of the table, comprising the announcer source identifier.

By virtue of this aspect, the multicast server can communicate a pair {source identifier; source address} corresponding to a source newly arrived in the multicast group, to all the sources of the multicast group without them needing to subscribe beforehand to a source other than the server.

During the obtaining step, the address of the announcer source is extracted either from the fields of the announcement message received, or from the fields of the IP packet encapsulating the announcement message received.

During the verification step, the table of the pairs allows the server to detect and to signal the doubletons between source identifiers. Indeed, a source identifier, for example an SSRC identifier, must be unique in a multicast group, and a source which is a subscriber only to the multicast stream sent by the server does not know the SSRC identifiers already used and may very well chose an identifier already taken, thereby giving rise to a degradation of the quality of the multicast distribution to the sources in conflict.

If the server detects that the identifier received is already present in the table of the pairs {SSRC identifier; IP address}, this signifies that the source which has just subscribed has chosen an identifier already taken by another source. In this case, the new pair {identifier of the announcer source; address of the announcer source} is not added, and it is the former pair, with the address of the source subscribed before the announcer source, which will be sent in the management message.

The arrival item of information is for example the PT (Payload Type) field of an RTCP message, which takes the value 202, also indicating that the announcement message is an RTCP message of SDES type.

The management message sent can comprise only a single pair, in which case the management message sent is for example another SDES RTPC message.

Hence by virtue of this aspect of the distribution method according to the invention, the multicast server can communicate in a single management message several pairs {source identifier; source address} of its table, optionally all the pairs of its table, to all the sources of the multicast group without them needing to subscribe beforehand to a source other than the server. Thus, a source which subscribes only to the multicast stream sent by the server knows the SSRC identifiers already used, and this will facilitate its choice in the case where it must modify its own identifier.

Such a management message sent can for example take the form of an SDES RTCP message aggregating several pairs {source identifier; source address} in one and the same SDES RTCP message.

According to one aspect of the distribution method according to the invention, when the multicast announcement message comprises an item of information regarding departure of the announcer source from the multicast group, the reception step is followed by a step of removal, in table of pairs {source identifier; source address}, of the pair corresponding to the identifier of the announcer source.

By virtue of this aspect, the table of pairs {source identifier; source address} remains updated, upon the departure of a source from the multicast group.

The departure item of information is for example the PT field of an RTCP message, which takes the value 203, also indicating that the announcement message is an RTCP message of BYE type.

The management message sent is for example a BYE RTPC message, with the same identifier of the announcer source.

According to another aspect of the distribution method, when the multicast announcement message comprises an item of information regarding departure of the announcer source from the multicast group, the reception step is followed by a step of obtaining an address of the announcer source and by a step of verification that the identifier of the announcer source is indeed associated with the address obtained, in a table of pairs {source identifier; source address}. If the identifier is associated therein with another address, this pair is not removed from the table, and is sent in a management message of SDES RTCP type, instead of a message of BYE RTCP type.

This verification step is aimed at preventing an illegitimate source from using the identifier of another legitimate source in a departure announcement message. The step of sending such an SDES RTCP message exhibits the advantage of informing the two sources, legitimate and illegitimate, of the attempted use of the identifier of the legitimate source in a departure announcement message.

The various aspects of the method for distributing identifiers which have just been described can be implemented independently of one another or in combination with one another.

The invention further relates to a device for distributing identifiers which is able to implement the method for distributing identifiers which has just been described, in all its embodiments.

The invention also relates to a method for processing identifiers of sources of a multicast distribution group, said sources being connected together through an electronic communications network, the multicast distribution group being identified by a group address, a stream sent to the multicast group address by a first source being received by a second source if the second source is previously a subscriber to the first source, one of the sources, the so-called server, being a subscriber to all the other sources, one of the sources, the so-called client, being a subscriber to the server and not being a subscriber to the other sources, and having sent to the group address an arrival announcement message comprising an identifier of the client, said client comprising a table associating an address with a source identifier, the method comprising the following steps implemented by said client:

reception, originating from the server, of a management message comprising at least one identifier of an announcer source, if the management message comprises an arrival item of information, addition to the table of at least one pair associating an address with the at least one identifier, the address being included and associated in the management message, if the management message comprises a departure item of information, removal of a corresponding pair {identifier of the announcer source; address} from the table.

By virtue of the processing method and of its table of pairs {source identifier; source address}, a source (said client) can obtain the address of another source so as to be able optionally to subscribe thereto, without having to implement a particular action, in contradistinction to the earlier technique. Several schemes exist according to the earlier technique for obtaining these addresses. A first scheme is to use a signaling protocol such as SIP (Session Initiation Protocol) used in telephony to indicate to the opposite parties the remote IP address to be taken into account). A second scheme is to employ a directory (enum, http base, etc.), for example.

Moreover, the step of removal allows the source to keep its table of pairs {source identifier; source address} updated, when another source quits the multicast group.

According to one aspect of the processing method according to the invention, when the client is the announcer source, said client possessing an address, the so-called client address, the method furthermore comprises:

a verification step intended to verify whether a pair {identifier; address} included in the management message received associates the identifier of the client with an address different from the client address, and, in case of positive verification, a step of modification of the identifier of the client, and a step of sending, to the group address, of a new arrival announcement message comprising the modified identifier.

By virtue of this aspect, a source (said client) is able to verify, immediately after subscribing to the server, whether the identifier that it has chosen is unique, doing so without needing to be subscribed to the other sources. Indeed, since the server sends pairs {source identifier; source address} of the table as soon as the client's arrival announcement message is received, and since these pairs comprise the identifiers of the sources that arrived before it, if in the management message the identifier of the client is associated with an address different from its own address, this signifies that its identifier was already taken by another source.

Advantageously, the client can then choose a new identifier which is not already present among the pairs received in the management message.

The invention further relates to a device for processing identifiers which is able to implement the method for processing identifiers which has just been described, in all its embodiments.

The invention also relates to a server item of equipment of a multicast distribution group, the server item of equipment being connected to an electronic communications network and comprising a device such as described above for distributing identifiers of sources.

This server item of equipment may be for example a television server, a games server, a videoconferencing server or else a sensor network server.

The invention also relates to a client item of equipment of a multicast distribution group, the client item of equipment being connected to an electronic communications network and comprising a device such as described above for processing identifiers of sources.

This client item of equipment may be for example a user terminal such as a smartphone, a digital tablet, a computer or a sensor.

The invention further relates to a multicast distribution group comprising a server item of equipment and at least two client items of equipment such as described above, said server item of equipment and client items of equipment being connected together through an electronic communications network.

The invention also relates to a computer program comprising instructions for the implementation of the steps of the method for distributing identifiers of sources which has just been described, when this method is executed by a processor.

The invention relates moreover to a recording medium, readable by a server item of equipment, on which the program which has just been described is recorded, being able to use any programming language, and be in the form of source code, object code, or of code intermediate between source code and object code, such as in a partially compiled form, or in any other desirable form.

The invention also relates to a computer program comprising instructions for the implementation of the steps of the method for processing identifiers of sources which has just been described, when this method is executed by a processor.

The invention relates finally to a recording medium, readable by a client item of equipment, on which the program which has just been described is recorded, being able to use any programming language, and be in the form of source code, object code, or of code intermediate between source code and object code, such as in a partially compiled form, or in any other desirable form.

4. PRESENTATION OF THE FIGURES

Other advantages and characteristics of the invention will be more clearly apparent on reading the following description of a particular embodiment of the invention, given by way of simple illustrative and nonlimiting example, and of the appended drawings, among which.

5. DETAILED DESCRIPTION OF AT LEAST ONE EMBODIMENT OF THE INVENTION

In the subsequent description, examples are presented of several embodiments of the invention based on the multicast distribution protocols of the IETF, but the invention also applies to other protocols, such as for example ATM (Asynchronous Transfer Mode) or Ethernet, or else a transport protocol suitable for sensors, such as ZigBee, Bluetooth or Wi-Fi.

In the subsequent description, the word client designates a source of a multicast group other than the server of this multicast group.

Figure 1:
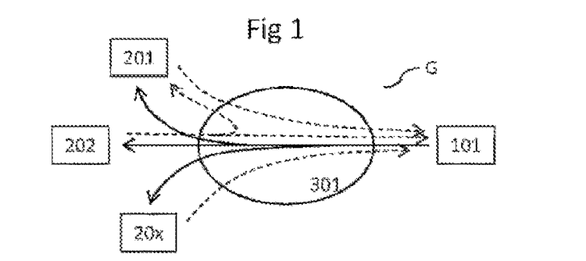
FIG. 1 presents in a schematic manner a multicast distribution group in a network comprising several sources, one of which a server, according to an aspect of the invention.

FIG. 1 presents in a schematic manner a multicast distribution group in a network comprising several sources, one of which a server, according to an aspect of the invention.

In such a multicast distribution group G with address aG, each source is connected to an electronic communications network 301, generally a network of IP type, and can send toward the network 301 packets destined for aG.

The sources are either clients, such as the clients 201 to 20x, or a server, such as the server 101.

At the minimum, each client 201 to 20x subscribes to the multicast stream with address aG, sent by the server 101. All the clients therefore receive everything that is sent by the server to aG, as indicated by the solid lines. A client does not receive what is sent by another client as long as it is not expressly subscribed to the multicast stream with address aG sent by this other client.

On its side, the server subscribes to the multicast streams with address aG sent by each of the clients 201 to 20x. The server therefore receives everything that is sent by the clients to aG, as indicated by the dashed lines, thereby allowing it in particular to receive their respective RTP traffic.

In a multicast group, a source sends real-time data, also called RTP traffic, and control messages, also called RTCP messages. RTP packets are for example distributed every ten milliseconds, but the RTCP control messages are distributed with a lower frequency, for example every second.

When it subscribes to the multicast stream with address aG sent by the server 101, a client sends immediately after an SDES RTCP message to the address aG. Such an SDES message comprises the IP address of the client, and an SSRC identifier that it has chosen so as to be recognized within the multicast group.

An SDES RTCP message received originating from a client by the server therefore allows the server to establish the relationship between the IP address and the SSRC identifier of the client. Indeed, the messages of SDES RTCP type can comprise, in addition to the SSRC identifier of the sending source, another identifier containing, in ASCII form, the IPv4 or IPv6 address of this source.

According to the invention, the server re-sends to the address aG the SDES RTCP messages received from the various clients, or aggregates their content so as to send an "aggregated" SDES RTCP message to the address aG.

According to the invention, when the SDES RTCP message received from a client does not contain any IP address, the server can add to the SDES RTCP message the source IP address of the IP packet received, containing the SDES message sent by the client.

When the clients receive this SDES RTCP message from the server, this allows them, likewise, to establish the relationship between the IP addresses of the other clients and their respective SSRC identifier. The knowledge of this relationship is necessary for at least two reasons:

1. if a client wishes to subscribe to the multicast stream of another client, for example the client 201 to the multicast stream with address aG of the client 202, it must know the IP address of the client 202; indeed, a request for subscription to the stream of a client, using for example an IGMPv3 or MLDv2 request, must specify the IP address of this client;
2. an SSRC identifier must be unique in a multicast group, and a client that has subscribed only to the multicast stream sent by the server does not know the SSRC identifiers already used and may very well choose an identifier already taken, thereby giving rise to a degradation of the quality of the multicast distribution to the clients in conflict.

Figure 2:
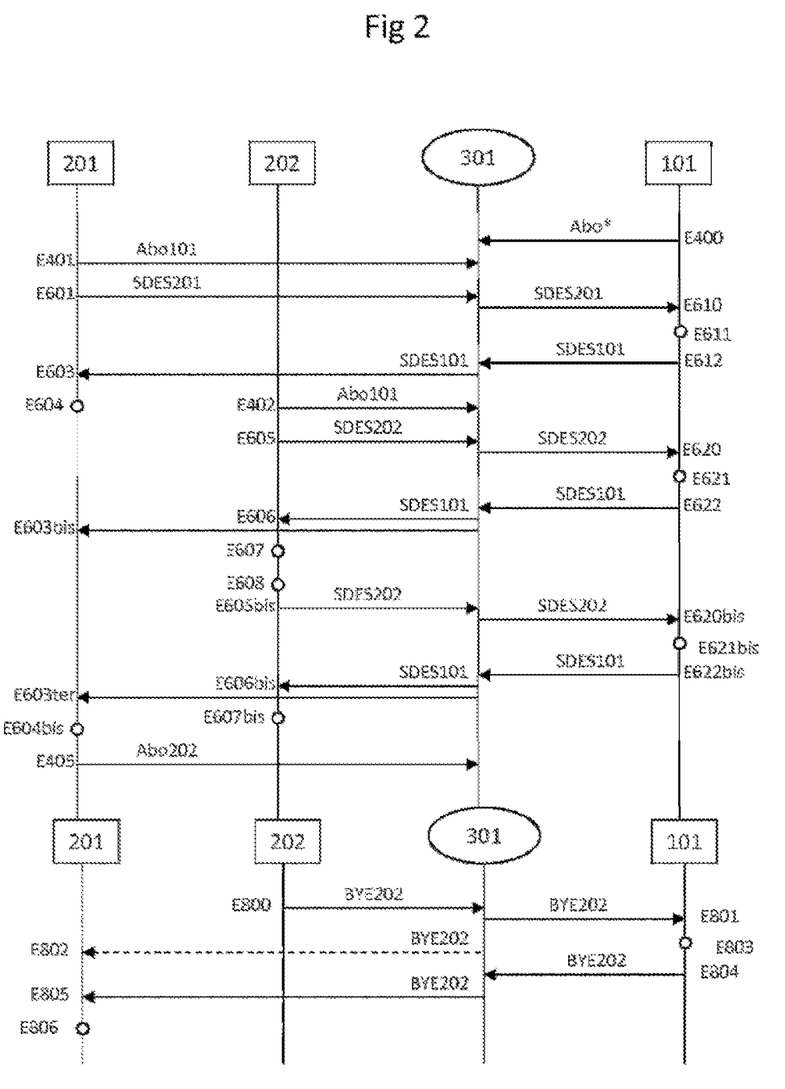
FIG. 2 presents an exemplary stringing together and implementation of the steps of the method for distributing identifiers of sources and of the method for processing identifiers of sources, according to an aspect of the invention.

FIG. 2 presents an exemplary stringing together and implementation of the steps of the method for distributing identifiers of sources and of the method for processing identifiers of sources, according to an aspect of the invention.

For ease of illustration, the number of clients is reduced to two in the figure, with a first client 201 wishing to subscribe to a second source other than the server, and a single second client 202. The following explanations also apply to the case where other client sources 203, 204, etc. form part of the multicast group.

During a step E400, the server 101 subscribes to the set of streams destined for the multicast address aG, by sending an IGMPv3 or MLDv2 request to the network 301, specifying the address aG as multicast group address and not excluding any source address.

During a step E500, not illustrated, the server 101 begins to send RTP traffic to the multicast address aG by using its source address S. None of the clients 201 or 202 receives this traffic, or any other traffic sent by the address S, as long as they are not individually subscribed to the stream, sent by the address S, destined for the multicast address aG.

During a step E401, the client 201 subscribes to the stream, sent by the address S, destined for the multicast address aG, by sending an IGMPv3 or MLDv2 request to the network 301, specifying the address aG as multicast group address and the address S as source address. The client 201 begins to receive the RTP traffic sent for the multicast group by the address S, that is to say by the server.

During a step E601, the client 201 sends an SDES RTCP message comprising its own address IP1 and its own multicast identifier SSRC1.

During a step E610, the server 101 receives the SDES RTCP message comprising the pair {SSRC1; IP1}.

During a step E611, the server 101 in its table T101 verifies that the identifier SSRC1 is not already present in association with a different IP address from IP1. As this is not the case it adds the pair {SSRC1; IP1} to its table T101.

As no other client was subscribed to the multicast group before the client 101, the table T101 contains only the pair {SSRC1; IP1}.

During a step E612, the server 101 generates and sends an SDES RTCP message, comprising the pair {SSRC1; IP1}.

During a step E603, the client 201 receives this SDES RTCP message.

During a step E604, the client 201 verifies in the message received that its identifier SSRC1 is not associated with an IP address other than IP1. As this is not the case, it adds the pair {SSRC1; IP1} to its table T201. Alternatively, the client 201 may note that these are its own identifier and its own address, and decide not to add this pair, which does not afford it any new information, to its table.

During a step E402, the client 202 subscribes to the stream, sent by the address S, destined for the multicast address aG, by sending an IGMPv3 or MLDv2 request to the network 301, specifying the address aG as multicast group address and the address S as source address. The client 202 begins to receive the RTP traffic sent for the multicast group by the address S, that is to say by the server.

During a step E605, the client 202 sends an SDES RTCP message comprising its own address IP2 and its own multicast identifier SSRC1.

During a step E620, the server 101 receives the SDES RTCP message comprising the pair {SSRC1; IP2}.

During a step E621, the server 101 verifies in its table T101 that the identifier SSRC1 is not already present in association with a different IP address from IP1. As this is the case, it does not add the pair {SSRC1; IP2} to its table T101.

The table T101 still contains only the pair {SSRC1; IP1}.

During a step E622 identical to step E612, the server 101 generates and sends an SDES RTCP message, comprising the pair {SSRC1; IP1}.

During a step E603*bis* identical to step E603, the client 201 receives this SDES RTCP message.

During a step E606, the client 202 also receives this SDES RTCP message.

During a step E607, the client 202 verifies in the message received that its identifier SSRC1 is not associated with an IP address other than IP2.

As this is the case, in addition to adding the pair {SSRC1; IP1} to its table T201, it modifies its own identifier into SSRC2 during a step E608.

During a step E605bis, the client 202 sends an SDES RTCP message comprising its own address IP2 and its modified multicast identifier SSRC2.

During a step E620bis, the server 101 receives the SDES RTCP message comprising the pair {SSRC2; IP2}.

During a step E621bis, the server 101 in its table T101 verifies that the identifier SSRC2 is not already present in association with a different IP address from IP2. As this is not the case it adds the pair {SSRC2; IP2} to its table T101.

The table T101 now contains the pairs {SSRC1; IP1} and {SSRC2; IP2}.

During a step E622bis, the server 101 generates and sends an SDES RTCP message, comprising the pairs {SSRC1; IP1} and {SSRC2; IP2}.

During a step E603ter, the client 201 receives this SDES RTCP message.

During a step E606bis, the client 202 receives the same SDES RTCP message.

During a step E604bis, the client 201 verifies in the message received that its identifier SSRC1 is not associated with an IP address other than IP1. As this is not the case, it adds the pairs {SSRC1; IP1} and {SSRC2; IP2} to its table T201. In an alternative mode, the client 201 can decide not to add pair {SSRC1; IP1}, which does not afford it any new information, to its table.

During a step E607bis, the client 202 verifies in the message received that its identifier SSRC2 is not associated with an IP address other than IP2. As this is not the case, it adds the pairs {SSRC1; IP1} and {SSRC2; IP2} to its table T202. In an alternative mode, the client 202 can decide not to add pair {SSRC2; IP2}, which does not afford it any new information, to its table.

During a step E405, the client 201 subscribes to the stream destined for the multicast address aG sent by the address IP2 of the client 202, by sending an IGMPv3 or MLDv2 request to the network 301, specifying the address aG as multicast group address and the address IP2 as source address. The client 201 obtains the address IP2 by searching among the pairs in its table T201 for the IP address corresponding to the identifier SSRC2 of the client 202.

The client 201 can then begin to receive the RTP traffic sent by the client 202 to the multicast group with address aG.

The following steps describe the stringing together and the implementation of the method for distributing identifiers of sources and of the method for processing identifiers of sources, according to an aspect of the invention, when the announcement message is a departure message.

During a step E800, the client 202 quits the multicast group and sends a BYE RTCP message destined for the multicast address aG, comprising its identifier SSRC2.

In a first case, it is assumed that the client 201 is no longer subscribed to the client 202, and does not receive the BYE RTCP message.

During a step E801, the server 101 receives the BYE RTCP message comprising the identifier SSRC2.

During a step E803, the server removes the pair {source identifier; source address} corresponding to the identifier SSRC2, that is to say the pair {SSRC2; IP2}, from its table T101.

The table T101 now contains only the pair {SSRC1; IP1}.

During a step E804, the server 101 sends to the multicast address aG a BYE RTCP message, comprising the identifier SSRC2.

For security, in a variant, the server can, before steps E803 and E804, verify that the BYE RTCP message has indeed been sent from the address IP2 corresponding to the identifier SSRC2.

During a step E805, the client 201 receives this BYE RTCP message.

During a step E806, the client 201 removes the pair {source identifier; source address} corresponding to the identifier SSRC2, that is to say the pair {SSRC2; IP2}, from its table T201.

The table T201 now contains only the pair {SSRC1; IP1}.

In a second case, it is assumed that the client 201 is still subscribed to the client 202, and also receives, during a step E802, the BYE RTCP message sent during step E800.

In this case, step E806 is performed thereafter, and before step E805 which is no longer relevant.

Figure 3:
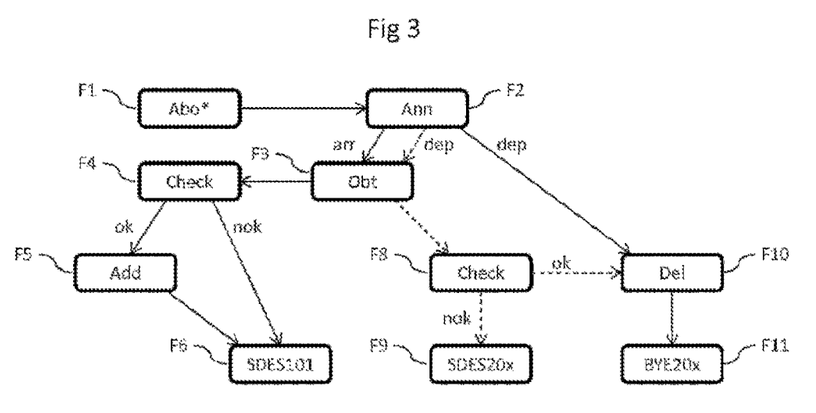
FIG. 3 presents an exemplary implementation, by a server, of the steps of the method for distributing identifiers of sources, according to an aspect of the invention

FIG. 3 presents an exemplary implementation, by a server, of the steps of the method for distributing identifiers of sources, according to an aspect of the invention.

During a step F1, the server 101 subscribes to the multicast group with address aG by sending to the network 301 a subscription request specifying the address aG of the multicast group, without excluding any source.

During a step F2, the server 101 receives from a client 20x an announcement message.

If the announcement message is an SDES RTCP message, that is to say if it is an announcement message regarding arrival of a client in the multicast group, the method goes to step F3.

If the announcement message is a BYE RTCP message, that is to say if it is a departure announcement message of a client of the multicast group, the method goes to step F10.

During a step F3, the server obtains the address of the client 20x either directly from the announcement message received, or from a field of the IP packet encapsulating the announcement message received.

During a step F4, the server 101 verifies in its table T101 of pairs {identifier; address} whether the identifier SSRCx included in the SDES RTCP message received is not already present in association with a different IP address from IPx also included in the SDES RTCP message received.

If this is not the case, the server adds the pair {SSRCx; IPx} to its table during a step F5, and the method goes to step F6.

If this is the case, that is to say if the client 20x uses an identifier already taken by another client, the method goes directly to step F6.

During a step F6, the server 101 generates and sends to the multicast address aG an aggregated SDES RTCP message, comprising the pairs {IP address; SSRC identifier} of its table T101. This message is therefore distributed to the clients of the multicast group, and allows them to verify their own identifier so as optionally to modify it, and to build their own table of pairs {IP address; SSRC identifier}.

During a step F10, the server 101 removes from its table T101 of pairs {identifier; address} the one corresponding to the identifier SSRCx included in the BYE RTCP message received. For security, in a variant, the server can, before removing the pair, verify that the BYE RTCP message has indeed been sent from the address IPx corresponding to the identifier SSRCx.

During a step F11, the server 101 sends to the multicast address aG a BYE RTCP message, comprising the identifier SSRCx. This message is therefore distributed to the clients of the multicast group, and allows them to update their own table of pairs {IP address; SSRC identifier} by removing the pair corresponding to the identifier SSRCx.

In a variant of the method when the announcement message is a BYE RTCP message, step F2 is nevertheless followed by step F3 of obtaining the address of the client that sent the announcement message, on the basis of a field of the IP packet encapsulating the announcement message. The method thereafter goes to step F8.

During a step F8, the server verifies that the identifier of the announcer source is indeed associated with the address obtained, in its table of pairs T101 {source identifier; source address}. If the identifier is associated therein with an address other than the address obtained, on the one hand the pair is not removed from the table since the BYE RTCP announcement message is illegitimate, and on the other hand the server sends, during a step F9, a management message of SDES RTCP type comprising the identifier and the other address.

If the identifier is associated therein with the address obtained the method goes to step F10.

Figure 4:
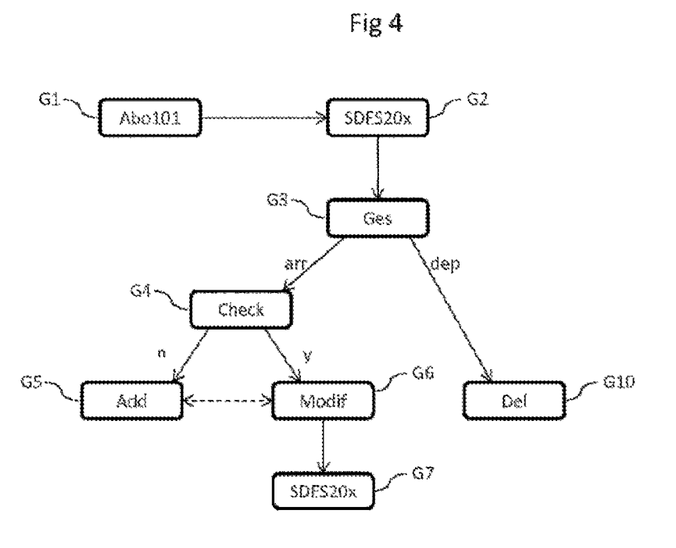
FIG. 4 presents an exemplary implementation, by a client, of the steps of the method for processing identifiers of sources, according to an aspect of the invention.

FIG. 4 presents an exemplary implementation, by a client, of the steps of the method for processing identifiers of sources, according to an aspect of the invention.

During a step G1, the client 20x sends to the network 301 a request for subscription to the multicast group with address aG while specifying as source the IP address of the server 101.

During a step G2, the client 20x sends an SDES RTCP arrival announcement message comprising its address IPx and the identifier SSRCx that it has chosen.

During a step G3, the client 20x receives a management message originating from the server 101.

If the management message is an SDES RTCP message, comprising one or more pairs {IP address; SSRC identifier} corresponding to the various sources of the multicast group with address aG, that is to say if the message is an arrival management message, the method goes to step G4.

If the management message is a BYE RTCP message, comprising an identifier SSRCz corresponding to a source which has just quit the multicast group with address aG, that is to say if the message is a departure management message, the method goes to step G10.

During a step G4, the client 20x verifies among the pairs received its identifier SSRCx is not associated with an IP address other than IPx.

If this is not the case, the client 20x adds the pairs received to its table T20x, during a step G5. It may happen that pairs are already included in the table; the sense of the term "add" is that whose effect is that the pairs included in the message received during step G3 are in the table T20x.

If this is the case, on the other hand, this signifies that the identifier SSRCx has already been taken by another client before the client 20x. The client 20x then modifies, during a step G6, its own identifier into SSRCy. In an alternative mode, the method may nevertheless perform step G5 even if it performs step G6, thereby allowing the client 20x to have an up-to-date table T20x.

After step G6, during a step G7, the client 20x sends a new SDES RTCP message comprising its own address IPx and its modified multicast identifier SSRCy.

Steps G4 to G7 are performed by the method when the announcement message received by the client 20x during step G3 is an arrival announcement message.

When the announcement message received by the client 20x during step G3 is a departure announcement message, the method performs the following step G10 instead.

During a step G10, the client 20x removes the pair {source identifier; source address} corresponding to the identifier SSRCz, that is to say the pair {SSRCz; IPz}, from its table T20x.

Figure 5:
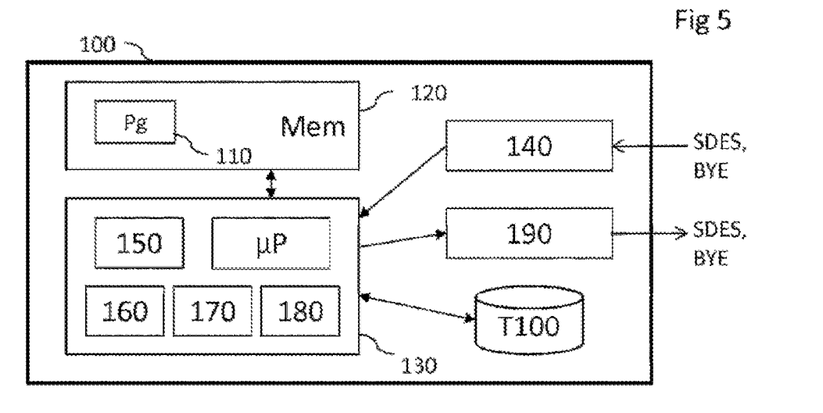
FIG. 5 presents an exemplary structure of a device for distributing identifiers of sources, according to an aspect of the invention.

In conjunction with FIG. 5, an exemplary structure of a device for distributing identifiers of sources, according to an aspect of the invention is now presented.

The device 100 for distributing identifiers of sources implements the method for distributing identifiers of sources, various embodiments of which have just been described.

Such a device 100 can be implemented in a multicast server, such as a TV server, a games server, a videoconferencing server or else a sensor network server.

For example, the device 100 comprises a processing unit 130, equipped for example with a microprocessor μP, and driven by a computer program 110, stored in a memory 120 and implementing the method for distributing identifiers of sources according to the invention. On initialization, the code instructions of the computer program 110 are for example loaded into a RAM memory, before being executed by the processor of the processing unit 130.

Such a device 100 comprises:
- a reception module 140, able to receive from a client of a multicast group an arrival or departure announcement message, comprising respectively a pair {client identifier; client address}, or a client identifier,
- an obtaining module 150, able to obtain the address of the client that sent the arrival or departure message, on the basis of the message or of the IP packet encapsulating the message,
- a verification module 160, able to verify in a table T100 of pairs {client identifier; client address} that the identifier of the client included in the announcement message is not already taken by another client, if the announcement message is an arrival announcement message,
- an addition module 170, able to add to the table T100 the pair {client identifier; client address} corresponding to the client, if the announcement message is an arrival announcement message,
- a removal module 180, able to remove from the table T100 the pair {client identifier; client address} corresponding to the client, if the announcement message is a departure announcement message,
- a sending module 190, able to send a management message to the address of the multicast group, comprising pairs of the table T100 in the case of arrival, or the identifier of the announcer client in the case of departure.

Figure 6:
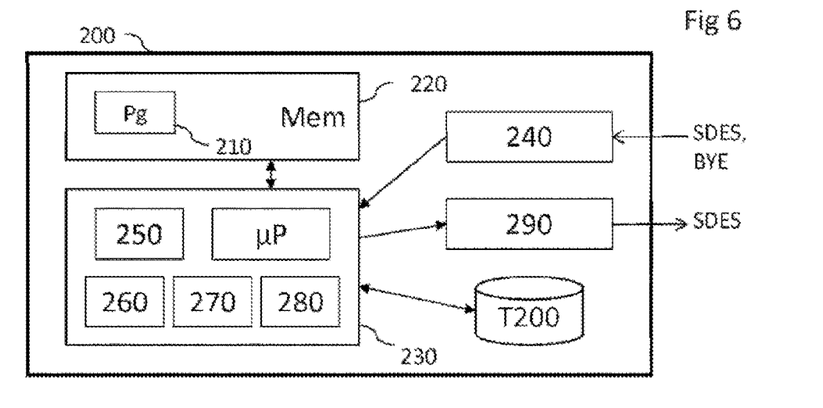
FIG. 6 presents an exemplary structure of a device for processing identifiers of sources, according to an aspect of the invention.

In conjunction with FIG. 6, an exemplary structure of a device for processing identifiers of sources according to an aspect of the invention is now presented.

The device 200 for processing identifiers of sources implements the method for processing identifiers of sources, various embodiments of which have just been described.

Such a device 200 can be implemented in a user terminal, the so-called receiver client, such as a smartphone, a digital tablet, a computer or a sensor.

For example, the device 200 comprises a processing unit 230, equipped for example with a microprocessor uP, and driven by a computer program 210, stored in a memory 220 and implementing the method for processing identifiers of sources according to the invention. On initialization, the code instructions of the computer program 210 are for example loaded into a RAM memory, before being executed by the processor of the processing unit 230.

Such a device 200 comprises:
- a reception module 240, able to receive from a server of a multicast group an arrival or departure management message, comprising respectively pairs {client identifier; client address}, or a client identifier,
- a verification module 250, able to verify in the pairs {client identifier; client address} received that the identifier of the receiver client is not taken by another client, if the management message is an arrival management message,
- an addition module 260, able to add to a table T200 the pairs {client identifier; client address} received, if the management message is an arrival management message,
- a modification module 270, able to modify the identifier of the receiver client if it is taken by another client, and if the management message is an arrival management message,
- a removal module 280, able to remove from the table T200 the pair {client identifier; client address} corresponding to the client identifier received, if the management message is a departure management message,
- a sending module 290, able to send to the address of the multicast group an arrival announcement message, comprising the pair {modified identifier of the receiver client; address of the receiver client}, if the management message is an arrival management message.

The modules described in conjunction with FIGS. 5 and 6 can be hardware modules or software modules.

The exemplary embodiments of the invention which have just been presented are merely a few of the conceivable embodiments. They show that the invention allows a source of a bidirectional multicast distribution group to know whether its identifier is unique immediately after subscribing to the server of the multicast group, and to modify its identifier if this is not the case. Thus, a degradation of the quality due to conflict between sources using the same identifier is avoided. The invention also allows a source to know all the identifiers and IP addresses of the other sources of the group, without needing to subscribe to these sources. Thus, it is no longer necessary to retrieve the IP address of a source by another means in order to subscribe thereto.

The invention claimed is:

1. A method comprising:
   distributing identifiers of sources of a multicast distribution group, said sources being connected together through an electronic communications network, the multicast distribution group being identified by a group address, a stream sent to the group address by a first source of the group being received by a second source of the group if the second source is previously a subscriber to the first source, one of the sources, called a server, being a subscriber to all the other sources of the group, wherein distributing identifiers comprises the following acts implemented by the server:
   receiving a multicast announcement message comprising an announcer source identifier, the multicast announcement message originating from one of said other sources, called an announcer source,
   sending a management message, destined for the group address, comprising the announcer source identifier.

2. The method for distributing identifiers as claimed in claim 1, according to which, when the multicast announcement message received during the act of receiving comprises an item of information regarding arrival of the announcer source in the multicast group,
   the receiving act is followed by the following acts:
   obtaining an address of the announcer source,
   verifying the presence of the identifier of the announcer source in a table of pairs {source identifier; source address},
   in case of negative verification, adding a pair {identifier of the announcer source; address of the announcer source} to the table,
   and wherein the management message sent during the sending act comprises at least one pair of the table, comprising the announcer source identifier.

3. The method for distributing identifiers as claimed in claim 1, according to which, when the multicast announcement message comprises an item of information regarding departure of the announcer source from the multicast group,
   the act of receiving is followed by an act of removing, in table of pairs {source identifier; source address}, the pair corresponding to the identifier of the announcer source.

4. The method for distributing identifiers as claimed in claim 1, according to which, when the multicast announcement message comprises an item of information regarding departure of the announcer source from the multicast group,
   the receiving act is followed by the following acts:
   obtaining an address of the announcer source,
   verifying that the identifier of the announcer source is associated with the address obtained, in a table of pairs {source identifier; source address},
   in case of the announcer source identifier being associated with a different address from the obtained address, the pair {announcer source identifier; different source address} is not removed from the table, and sending the pair {announcer source identifier; different source address} in a management message.

5. The method for distributing identifiers as claimed in claim 4, where the management message is of the SDES (Source DEScription) RTCP (Real Time Control Protocol) type.

6. A method comprising:
   processing identifiers of sources of a multicast distribution group, said sources being connected together through an electronic communications network, the multicast distribution group being identified by a group address, a stream sent to the multicast group address by a first source of the group being received by a second source of the group if the second source is previously a subscriber to the first source, one of the sources, called a server, being a subscriber to all the other sources, one of the sources, called a client, being a subscriber to the server and not being a subscriber to the other sources, and having sent to the group address an arrival announcement message comprising an identifier of the client, said client comprising a table associating an address with a source identifier, wherein processing identifiers comprises the following acts implemented by said client:
   receiving a management message comprising at least one identifier of an announcer source, the management message originating from the server,
   if the management message comprises an arrival item of information, adding to the table at least one pair associating an address with the at least one identifier, the address being included and associated in the management message, if the management message comprises a departure item of information, removing a corresponding pair {identifier of the announcer source; address} from the table.

7. The method for processing identifiers as claimed in claim 6, according to which, when the client is the announcer source, said client possessing an address, called a client address, the method furthermore comprises:
verifying whether a pair {identifier; address} included in the management message received associates the identifier of the client with an address different from the client address, and, in case of positive verification,
modifying the identifier of the client, and
sending, to the group address, a new arrival announcement message comprising the modified identifier.

8. A device for distributing identifiers of sources of a multicast distribution group, said sources being connected together through an electronic communications network,
the multicast distribution group being identified by a group address,
a stream sent to the group address by a first source of the group being received by a second source of the group if the second source is previously a subscriber to the first source,
one of the sources, called a server, being a subscriber to all the other sources of the group,
the device comprising:
a processing unit;
a non-transitory computer-readable medium comprising instructions stored thereon, which configure the processing unit to perform acts of:
receiving a multicast announcement message comprising an announcer source identifier, the multicast announcement message originating from one of said other sources, called an announcer source,
sending a management message, destined for the group address, comprising the announcer source identifier.

9. The device according to claim 8, wherein the device constitutes a server item of equipment of the multicast distribution group, the server item of equipment being connected to the electronic communications network.

10. A device for processing identifiers of sources of a multicast distribution group, said sources being connected together through an electronic communications network,
the multicast distribution group being identified by a group address,
a stream sent to the multicast group address by a first source of the group being received by a second source of the group if the second source is previously a subscriber to the first source,
one of the sources, called a server, being a subscriber to all the other sources of the group,
one of the sources, called a client, being a subscriber to the server and not being a subscriber to the other sources, and having sent to the group address an arrival announcement message comprising an identifier of the client,
said client comprising a table associating an address with a source identifier,
the device comprising:
a processing unit;
a non-transitory computer-readable medium comprising instructions stored thereon, which configure the processing unit to perform acts of:
receiving a management message comprising at least one identifier of an announcer source, the management message originating from the server,
adding to the table at least one pair associating an address with the at least one identifier, the address being included and associated in the management message,
removing a corresponding pair {identifier of the announcer source; address} from the table.

11. The device according to claim 10, wherein the device constitutes a client item of equipment of the multicast distribution group, the client item of equipment being connected to the electronic communications network.

12. A non-transitory computer-readable recording medium comprising instructions stored thereon for implementation of a method, when the instructions are executed by a processor of a server, wherein the instructions configure the server to perform acts of:
distributing identifiers of sources of a multicast distribution group, said sources being connected together through an electronic communications network, the multicast distribution group being identified by a group address, a stream sent to the group address by a first source of the group being received by a second source of the group if the second source is previously a subscriber to the first source, one of the sources, called the server, being a subscriber to all the other sources of the group, the wherein distributing identifiers comprises the following acts implemented by the server:
receiving a multicast announcement message comprising an announcer source identifier, the multicast announcement message originating from one of said other sources, called an announcer source,
sending a management message, destined for the group address, comprising the announcer source identifier.

13. A non-transitory computer-readable recording medium comprising instructions stored thereon for implementation of a method, when the instructions are executed by a processor of a client item of equipment, wherein the instructions configure the client to perform acts of:
processing identifiers of sources of a multicast distribution group, said sources being connected together through an electronic communications network, the multicast distribution group being identified by a group address, a stream sent to the multicast group address by a first source of the group being received by a second source of the group if the second source is previously a subscriber to the first source, one of the sources, called a server, being a subscriber to all the other sources, one of the sources, called the client, being a subscriber to the server and not being a subscriber to the other sources, and having sent to the group address an arrival announcement message comprising an identifier of the client, said client comprising a table associating an address with a source identifier, wherein processing identifiers comprises the following acts implemented by said client:
receiving a management message comprising at least one identifier of an announcer source, the management message originating from the server,
if the management message comprises an arrival item of information, adding to the table at least one pair associating an address with the at least one identifier, the address being included and associated in the management message,
if the management message comprises a departure item of information, removing a corresponding pair {identifier of the announcer source; address} from the table.

* * * * *